(12) United States Patent
Wang et al.

(10) Patent No.: US 10,176,033 B1
(45) Date of Patent: Jan. 8, 2019

(54) LARGE-SCALE EVENT DETECTOR

(71) Applicant: Amazon Technologies, Inc., Seattle, WA (US)

(72) Inventors: Kai Wang, Seattle, WA (US); Peter Cheng-Shiang Fang, Redmond, WA (US); Haoyu Huang, Seattle, WA (US); Qi Li, Bellevue, WA (US); Yuanyuan Song, Shoreline, WA (US); Lechang Cheng, Sammamish, WA (US); Fyaaz Mohammad Barakati, Seattle, WA (US)

( * ) Notice: Subject to any disclaimer, the term of this patent is extended or adjusted under 35 U.S.C. 154(b) by 133 days.

(21) Appl. No.: 14/750,967

(22) Filed: Jun. 25, 2015

(51) Int. Cl.
*G06F 11/07* (2006.01)

(52) U.S. Cl.
CPC ......... *G06F 11/079* (2013.01); *G06F 11/076* (2013.01); *G06F 11/0709* (2013.01); *G06F 11/0793* (2013.01)

(58) Field of Classification Search
CPC .. G06F 11/079; G06F 11/0793; G06F 11/076; H04L 12/2421; H04L 41/0631
See application file for complete search history.

(56) References Cited

U.S. PATENT DOCUMENTS

| | | | | |
|---|---|---|---|---|
| 9,417,949 | B1* | 8/2016 | Bray | G06F 11/079 |
| 2005/0086091 | A1* | 4/2005 | Trumbly | G06Q 99/00 |
| | | | | 705/7.38 |
| 2008/0276222 | A1* | 11/2008 | Yamagami | G06F 11/1441 |
| | | | | 717/124 |
| 2010/0318846 | A1* | 12/2010 | Sailer | G06F 11/0748 |
| | | | | 714/26 |
| 2011/0239051 | A1* | 9/2011 | Basu | G06F 11/079 |
| | | | | 714/37 |
| 2012/0030522 | A1* | 2/2012 | Yabuki | G06F 11/0754 |
| | | | | 714/47.1 |
| 2013/0151907 | A1* | 6/2013 | Nakagawa | G06F 11/3452 |
| | | | | 714/47.1 |
| 2013/0204992 | A1* | 8/2013 | Kiris | H04L 41/0856 |
| | | | | 709/223 |
| 2013/0227589 | A1* | 8/2013 | Mikami | G06F 11/327 |
| | | | | 719/318 |
| 2014/0006871 | A1* | 1/2014 | Lakshmanan | H04L 41/065 |
| | | | | 714/37 |
| 2015/0026521 | A1* | 1/2015 | Yabuki | G06F 11/079 |
| | | | | 714/37 |
| 2015/0325108 | A1* | 11/2015 | Banerjee | G08B 29/20 |
| | | | | 340/506 |
| 2015/0347214 | A1* | 12/2015 | Samuni | G06F 21/552 |
| | | | | 714/37 |
| 2015/0363250 | A1* | 12/2015 | Yabuki | G05B 23/0254 |
| | | | | 714/37 |

* cited by examiner

*Primary Examiner* — Yolanda L Wilson
(74) *Attorney, Agent, or Firm* — Davis Wright Tremaine LLP

(57) ABSTRACT

A system and method for detecting the occurrence of an event causing multiple hosts to be unresponsive. The system and method including, for a set of hosts providing services to one or more customers of a computing resource service provider, determining one or more subsets of hosts that are unresponsive, determining whether the one or more subsets of hosts that are unresponsive meet a set of criteria for an occurrence of an large-scale event affecting multiple hosts, based at least in part on a determination that the set of criteria is met, initiating a remediation action.

19 Claims, 8 Drawing Sheets

LARGE-SCALE EVENT DETECTOR

BACKGROUND

For a customer relying on computing systems provided by a computing resource service provider for operation of the customer's business, the occurrence of a large-scale event that renders one or more of the computing systems inoperable, such as a power, thermal, or network failure, can have adverse consequences to the customer's business. Often, the customer and/or the computing resource service provider may not even become aware of the occurrence of the large-scale event until clients of the customer register complaints about difficulty in accessing the customer's computing systems, and an investigation is conducted by the computing resource service provider to determine the cause of the complaints. Furthermore, because determination of the occurrence of a large-scale event may depend on various factors, such as a number of affected computing systems, number of customers affected, extent of customers' reliance on the affected computing systems, and services provided by the affected computing systems, proactively detecting the occurrence of a large-scale event can be difficult.

BRIEF DESCRIPTION OF THE DRAWINGS

Various embodiments in accordance with the present disclosure will be described with reference to the drawings, in which.

DETAILED DESCRIPTION

Figure 1:
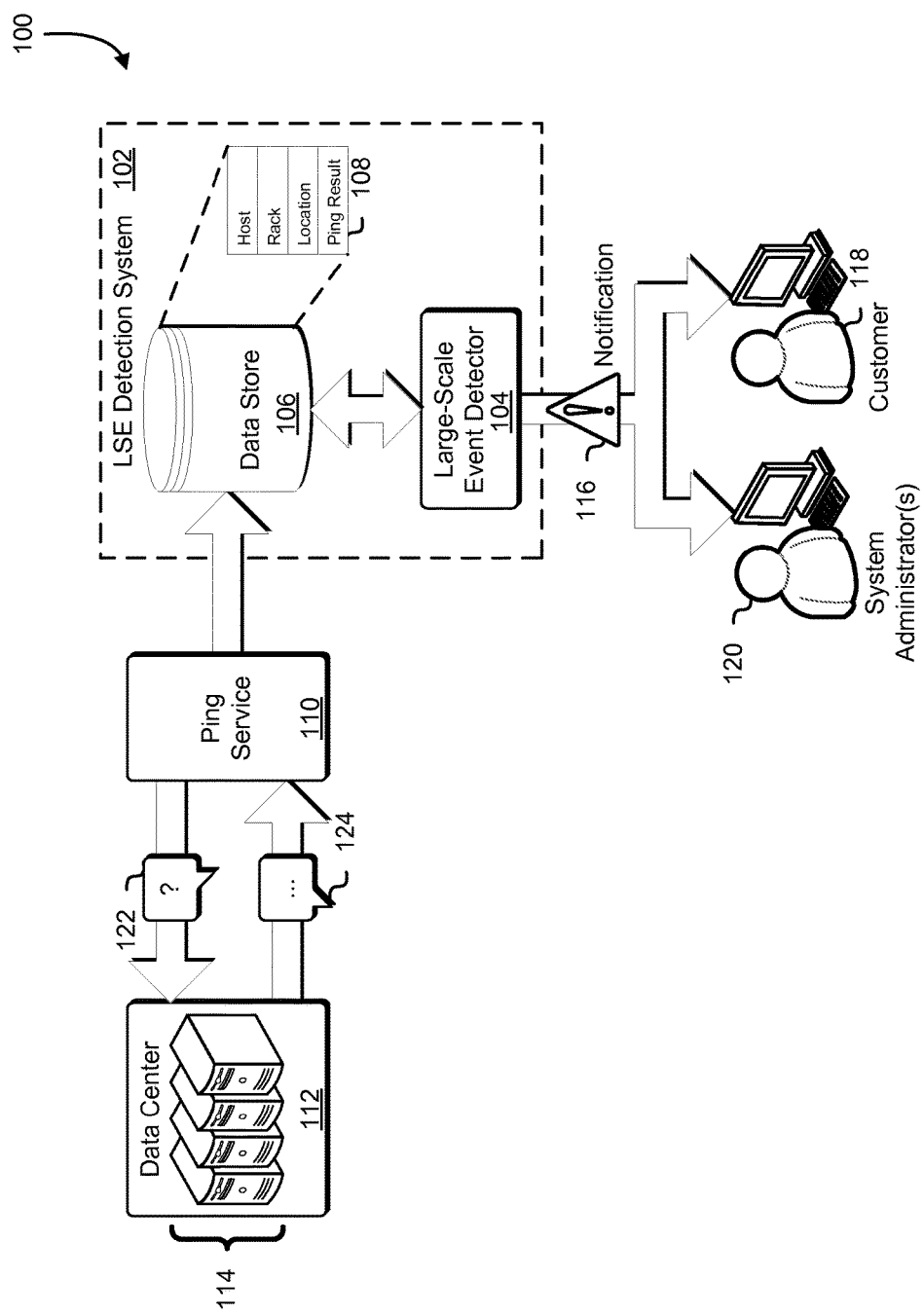
FIG. 1 illustrates an example of a large-scale event detection system in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested include a system and method for receiving criteria that indicates the occurrence of a large-scale event (e.g., thresholds, weight values reflecting criticality of hosts in a fleet of hosts, etc.) that causes the downtime of a sufficient number of hosts providing services to a customer of a computing resource service provider that the customer's business is impacted. In one embodiment, the techniques include counting a number of hosts that do not respond to a ping, and determining whether the number of unresponsive hosts exceeds a threshold specified to indicate that a large-scale event has occurred. In another embodiment, an impact weight may be assigned to each host in a fleet, with the impact value reflecting the priority of the respective host, such that an occurrence of a large-scale event is indicated when a sum of the weights of unresponsive hosts exceeds a specified value.

Techniques described and suggested in the present disclosure also include performing one or more large-scale event actions in response to determining that a large-scale event has occurred. One example of a large-scale event action may be to notify one or more system administrators, such as sending a notice or other alert to a monitoring application, sending one or more emails, or sending one or more text messages or pages. Another example of a large-scale event action may be to notify customers whose businesses may be impacted due to hosts providing services for the customers being affected by the large-scale event. Other techniques described in the present disclosure also include determining a start time for the large-scale event, filtering out hosts whose unresponsiveness is determined to be unrelated to the probable root cause of the large-scale event from the determination that the large-scale event has occurred, and determining whether the probable root cause of the large-scale event is power related, thermally related, or network related.

The described and suggested techniques improve the field of computing, and specifically the field of detecting large-scale events in distributed computing systems, by providing a new and useful system and method for determining the occurrence of a large-scale event. Additionally, the described and suggested techniques improve the functioning of distributed computer systems by providing notification of large-scale event to system administrators and other personnel tasked with maintaining the distributed computing system closer to the occurrence of the actual large-scale event, which may allow the probable root cause of the large-scale event to be more quickly diagnosed and resolved. Moreover, the described and suggested techniques offer meaningful advantages over a general event detection system by filtering out hosts whose root cause of being off-line are likely unrelated to a probable root cause of a current large-scale event.

FIG. 1 illustrates an aspect of an environment 100 in which an embodiment may be practiced. As illustrated in FIG. 1, the environment 100 may include a large-scale event detection system 102 with a large-scale event detector 104 that communicates to a data store 106 having at least one ping table 108 containing data received from a ping service 110 based on attempts to ping hosts in a data center 112. In some examples, an "event" may refer to a situation where one or more physical or virtual computing systems (also referred to as "hosts") that have been configured to provide services to customers of a computing resource service provider are unable, at least temporarily, to properly provide (e.g., hosts are off-line or otherwise unresponsive, the host network is down, etc.) the services that they were configured to provide. The event may be considered "large-scale" when the number of affected systems is such (e.g., exceeds a threshold) that it is determined to negatively impact the customer's ability to use the service. In some examples, the determination that a large-scale event has occurred is based on a number of affected systems exceeding a threshold number of affected systems; for example, 200 unresponsive hosts may qualify as a large-scale event. In other examples, systems may be "weighted" by importance, and a sum of the weights of the affected systems exceeding a threshold may qualify as a large-scale event. In still other examples, the determination of a large-scale event may vary based on various factors, including the number of hosts affected, the number of hosts utilized by the customer 118, the types of services provided by the host, the redundancy of the services provided by the host, the type of failure causing the large-scale event, and the total number of hosts in the system. For example, for the customer whose services provided by the computing resource service provider only run on one host, the customer 118 may be unable to use the services (which may impact the ability of the customer 118 to conduct his/her business) if even that one host becomes unresponsive, and, in some implementations, may therefore qualify as a large-scale event. Large-scale events may be caused by events that render the hosts unresponsive, such as power failure (e.g., generator failure, uninterruptible power supply (UPS), etc.), network failure, and thermal events. In some examples, a "thermal event" may refer to an event such as a cooling failure that causes a host to overheat and become unresponsive.

In one embodiment, the large-scale event is based on a number of unresponsive hosts (e.g., in a datacenter) exceeding a threshold value. For example, in a datacenter having 100 racks, each rack holding 40 hosts, a large-scale event may be defined as more than 800 hosts (i.e., 20%), the large-scale event threshold may be defined as:

$$\frac{\sum_{rack}^{N} \text{count\_of\_impacted\_hosts}}{\sum_{rack}^{N} \text{host\_count}} > \text{threshold \%}$$

In another embodiment, the large-scale event is based on a number of unresponsive hosts (e.g., in a datacenter) weighted according to a priority value. In such embodiments, the priority value may be determined based on the criticality of a particular service of the computing resource service provider being provided by the host. For example, a range of priorities between "1" and "7" may be assigned to hosts, with a priority of "1" assigned to the most essential hosts (e.g., hosts with the greatest business impact), such as a host providing a database service, and a priority of "7" may be designated for the least essential hosts (e.g., hosts the least business impact). In some implementations, weight is additionally or alternatively based on a service level agreement between the customer 118 and the computing resource service provider; for example, the service level agreement may specify that certain hosts of the customer 118 should be considered to have high priority. For example:

| Priority | 1 | 2 | 3 | 4 | 5 | 6 | 7 |
|---|---|---|---|---|---|---|---|
| Weight | 7 | 6 | 5 | 4 | 3 | 2 | 1 |

In such a case, the large-scale event threshold may be defined as:

$$\sum_{host}^{N} \text{weight\_of\_impacted\_host}_{host} > \text{threshold\_impact}$$

In an example where impact=30, a first case where 20 hosts of priority "7" are non-responsive, the large-scale event threshold is not exceeded (20×1=20). In a second case, where there are 15 non-responsive hosts of priority "7" and five non-responsive hosts of priority "2," the large-scale event threshold would be exceeded ((15×1)+(5×6)=45; which exceeds the impact of 30). In a third case, where there are ten non-responsive hosts of priority "4" and ten non-responsive hosts of priority "1," the large-scale event threshold would also be exceeded ((10×4)+(10×7)=110), and it can be seen that the third case has a bigger business impact than the second case. For example, in a distributed computing system of a computing resource service provider providing various services, an example of a priority "1" host may be a host that provides virtual computing services, a database, or provide block level storage services. An example of a priority "7" host may be a redundant host; that is, a host which, if off-line, does not negatively impact service performance.

In some embodiments, "noise" is filtered out of the ping data. For example, when determining whether to count an unresponsive host in the determination of whether a large-scale event has occurred, the large-scale event detector 104, with reference to the data in the data store 106, may identify a time at which the unresponsive host first became unresponsive. If this time precedes a likely start time of a large-scale event, the large-scale event detector 104 may determine not to count the particular unresponsive host. In other words, if the host has been off-line for some time (e.g., 48 hours, one week, etc.), the root cause of that host being off-line may be presumed to be a separate cause of other hosts that may also happen to be off-line, and in such a case it may be preferable not to count that particular unresponsive host for the purpose of determining the occurrence of a large-scale event. However, in other cases, it may be desirable to count every off-line system, as even in a case where a host has been off-line for a long period of time, that host is still a host that is not providing services to customers, and therefore that off-line host may still be counted for the purposes of determining the occurrence of a large-scale event. For example, in a case where the data center 112 holds 1,000 hosts and a large-scale event is defined as occurring when 200 hosts are off-line, a power related event that causes 150 hosts to go off-line would qualify as a large-scale event if 50 hosts were already off-line due to an unrelated issue. However, for purposes of determining a probable root cause of the large-scale event, those 50 hosts may be discounted, because their potentially varied causes of being unresponsive are likely different than the cause of the 150 hosts being unresponsive In the algorithms described in the present disclosure, the thresholds may be adjusted to avoid false alarms. For example, if the thresholds are set too low, the system administrators and/or the customers may be inundated with false large-scale event alerts triggered by routine equipment issues rather than an actual large-scale event. Conversely, the thresholds may be adjusted so that they are not too high. For example, a threshold that is too high may result in system administrators and/or customers not being alerted to all large-scale events of which they should be aware. In an algorithm that factors in a weight associated with a priority/criticality of the host, false alarms may also be avoided by adjusting the weights. For example, rather than having a weight that scales linearly from 1 to 7, the scale may range from 1 to 50.

The large-scale event detection system 102 may include resources such as data stores, computing systems, services, and network infrastructure suitable for performing large-scale event detection in accordance with the present disclosure. The large-scale event detector 104 may be one or more physical or virtual computing systems usable for determining the occurrence of large-scale events in accordance with the present disclosure. The large-scale event detector 104 may be any suitable system such as a server in the data center 112, multiple computing devices in a distributed system of a computing resource service provider, or any electronic client device such as the electronic client device 802 described in conjunction with FIG. 8. In embodiments of the present disclosure, the large-scale event detector 104 queries the data store 106, periodically or according to some other scheme, to compute a count of how many hosts of the set of hosts 114 are unresponsive, and in some embodiments, factor in the criticality of such unresponsive hosts. For example, the large-scale event detector 104 may query the data store 106 for data on unresponsive hosts once every minute. The data store 106 may have a table listing all of the hosts in the set of hosts 114, and if the ping service 110 pings all of the hosts of the set of hosts 114 once every minute and stores the results of the ping in the ping table 108, the large-scale event detector 104 may query the data store 106 to get a list of all hosts that were pinged in the last minute but did not reply.

The data store 106 may be any data store suitable for storing and retrieving information about the status of hosts, including one or more database tables or data files. The data store 106 may store information received from various sources such as from the ping service 110, from a building management system, from a network management system, or from one or more sensors, such as sensors monitoring power and thermal characteristics of the data center 112 and the set of hosts 114. As an illustrative example, the data store 106 of environment 100 is a database with the ping table 108. The ping table 108 may be a data table configured to store information about the hosts, such as a host identity (ID), rack identity, physical location, and result of a ping sent to the host associated with the host ID. In some cases, rack identity and the physical location of the hosts may be stored in a different table containing a master list of all hosts of the set of hosts 114.

The ping service 110 may be a service of the computing resource service provider that, periodically or according to some other scheme, pings individual hosts of the set of hosts 114 or network equipment of the set of hosts 114 in the data center 112. In addition to the host ID of the individual host pinged and a time at which the ping was sent, upon receiving a reply in response to a ping sent to an individual host, the ping service 110 may store data contained in the reply in the data store 106, such as a ping time, a latency, percentage of packet loss, and average round-trip. Upon receiving no reply from the ping request, such as if the request times out, the ping service 110 may also store this information in the data store 106, including the host ID of the unresponsive host, the time at which the ping was sent, and that the host was unresponsive. As noted, the ping service 110 may periodically ping each host of the set of hosts 114; for example, the ping service 110 may ping each host of the set of hosts 114 once every minute. In this example then, the data store 106 will have minute-by-minute entries for each host of the set of hosts 114. As another example, the ping service 110 may ping the top of rack switches of each rack of hosts of the set of hosts 114, and store the data contained in the reply in the data store 106.

The ping 122 may be an Internet Control Message Protocol (ICMP) echo request packet sent to a target host. The ping reply 124 may be an ICMP response to the ping. The process of pinging the target host may include measuring the time from transmission to reception (round-trip time) and recording any packet loss. The results of the pinging may be received in the ping reply in the form of a statistical summary of the response packets received, including the minimum, maximum, and the mean round-trip times, and sometimes the standard deviation of the mean. Note that an ICMP ping and ping reply are only illustrative examples, and it is contemplated in the present disclosure that other methods of determining a status of individual hosts or racks of a set of hosts 114 may be used with the large-scale detection system 102. For example, the individual hosts of the set of hosts 114 may, periodically or according to some other schedule, provide their status directly to the data store 106 of the large-scale detection system 102. In such an implementation, the failure of an individual host to provide its status to the data store 106 at an expected time may indicate that the individual host is unresponsive. Another alternative to using ping, may be to use a push messaging service to push information about the status of individual hosts to the data store 106 via a message of the push messaging service. Note too that embodiments of the present disclosure that do not utilize a ping service 110 may store additional or different information in the data store 106 that would be available from an ICMP echo packet request and response. For example, in a case where an individual host directly provides its status to the data store 106, the individual host may also provide data such as the current operating temperature of its central processing unit.

The data center 112 may be a one or more rooms for housing physical and virtual host computing systems in a distributed computing system for the computing resource service provider. The set of hosts 114 may be a set of physical or virtual computing system that are configured to provide one or more services of a computing resource service provider to one or more customers of the computing resource service provider. The physical hardware of the set of hosts 114 may be implemented in one or more racks in the data center 112. Each rack may hold multiple hosts. Each host may be a system such as a server, such as the web server 806, or application server 808 of FIG. 8, or any electronic client device such as the electronic client device 802 described in conjunction with FIG. 8.

The alert 116 (also referred to as an alarm or notification) may be one or more messages directed to the system administrator 120 of the data center 112 or to the customer 118 potentially affected by a large-scale event detected by the large-scale event detector 104. For example, the alert 116 sent to the system administrator 120 may notify the system administrator 120 of the occurrence of a large-scale event, and may additionally notify the system administrator 120 of the locations of the unresponsive hosts in the data center 112 as well as a time at which the large-scale event is determined to have started. Similarly, a message to a potentially affected customer may include information such as the particular services that are affected by the large-scale event, the potential impact to the customer 118 (e.g., that one or more services for the customer 118 may be temporarily off-line, that the network is experiencing a slowdown, or that one or more services of the customer 118 may be operating at a reduced capacity), and, in some cases, and estimated duration of the large-scale event. The alert 116 may be implemented in various forms, such as an icon on a user interface, an email message, a text message, a pop-up window, and/or audible alerts.

Note that other large-scale event actions beyond sending alerts are contemplated as within the scope of the present disclosure. For example, in some embodiments, upon the detection of the occurrence of the large-scale event, the large-scale event detector 104 may send boot requests to the unresponsive hosts (i.e., remote requests to apply power to the unresponsive hosts in order to attempt to boot them). In some embodiments, the boot requests may be made automatically by the large-scale event detector 104 upon the detection of a large-scale event. In other additional or alternative embodiments, the boot requests may be initiated manually by a system or network administrator or by a service owner through a user interface/console (such as, through an interface like the example interface 500 of FIG. 5) upon receiving the alert 116 indicating the occurrence of the large-scale event.

Note that the type of large-scale event actions to initiate may depend on a determined probable root cause (e.g., via a process similar to the process 700 of FIG. 7) of the large-scale event, on an impact or criticality value of one or more of the unresponsive hosts, the type of services provided by the unresponsive hosts impacted by the large-scale event, and/or on a determined start time of the large-scale event. For example, if the probable root cause is network related, the large-scale event detector 104 may send the alert 116 to a console of a network administrator, whereas if the probable root cause is thermally related, the large-scale event detector 104 may send the alert 116 to a facilities technician or other personnel responsible for maintaining the cooling equipment of the unresponsive hosts. As another example, if the large-scale event detector 104 determines that the start time for the large-scale event was recent, the large-scale event detector may initiate a large-scale event action that corresponds to a lower importance (e.g., blinking icon on a console application), whereas the large-scale event detector may initiate a large-scale event action that corresponds to elevated importance (e.g., sending a text message to a system administrator) upon determination that the start time of the large-scale event occurred farther in the past. In still another example, if the service provided by at least a majority of the unresponsive hosts impacted by the large-scale event is a database service, the large-scale event detector 104 may send the alert 116 to the service owners (i.e., administrators) of the database service, whereas if the service provided is a virtual computing system service, the large-scale event detector 104 may send the alert 116 to the service owners of the virtual computing system service.

As noted, the customer 118 may be a customer of a computing resource service provider. For example the customer 118 may be a purchaser of computing services, such as one or more virtual computing services, on-demand data storage services, archival data storage services, or other computing services from the computing resource service provider. The customer 118 may have clients or other users of the computing services of the customer 118. For example, the customer 118 may utilize the computing resources to operate an online marketplace for selling products to clients of the customer 118. As another example, the customer 118 may be a company having several employees and may utilize the computing resources to store files and other data of the employees of the customer 118. By notifying the customer 118 of the occurrence of the large-scale event, the large-scale event detection system 102 may prevent unnecessary expenditure of time and effort by the customer 118 in troubleshooting the hosts of the customer 118 to determine an extent of impact of an issue with the hosts of the customer 118.

The system administrator 120 may represent one or more terminals of the system, network, security, or other personnel of the computing resource service provider tasked with maintaining the set of hosts 114 and/or the infrastructure of the data center 112. Another aspect of embodiments of the present disclosure is determining the probable root cause of the large-scale event. For example, upon determination that a large-scale event has occurred, examination of thermal data, network status, and power information may be made to determine the type of event that has occurred. Recovery from a large-scale event caused by a thermal event is different from recovery from a large-scale event caused by a power failure. Thus, determining the type of event that has occurred may aid system administrators in determining how to best fix the problem and end the large-scale event. Furthermore, in embodiments where information such as host rack location is stored in the data store 106, notification of the system administrator 120 can allow the system administrator 120s to quickly locate the unresponsive hosts in the data center 112.

Figure 2:
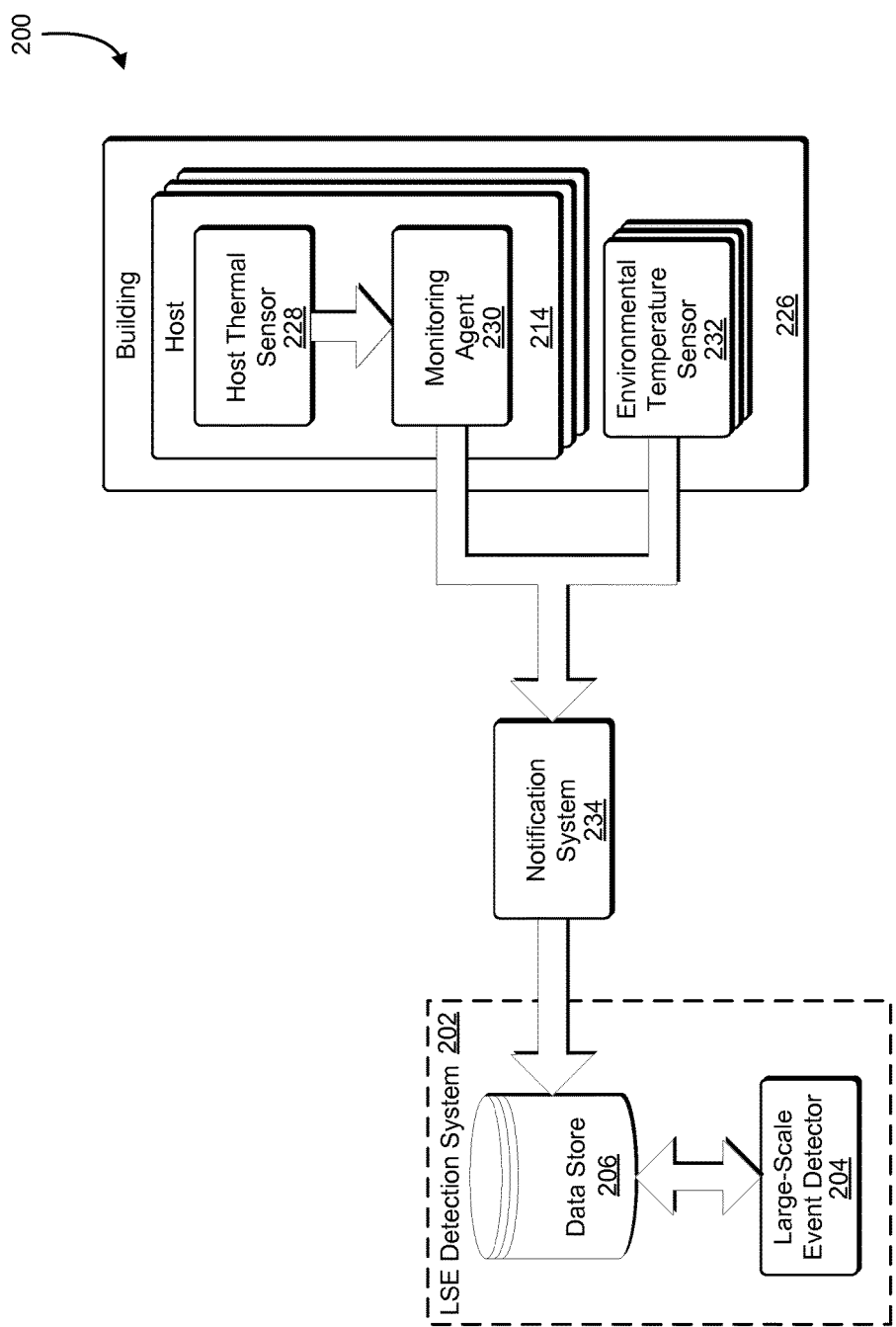
FIG. 2 illustrates an example of a large-scale event detection system receiving notifications of thermal data in accordance with an embodiment.

FIG. 2 illustrates an aspect of an environment 200 in which an embodiment may be practiced. As illustrated in FIG. 2, the environment 200 may include the large-scale event detection system 202 having a data store 206 and a large-scale event detector 204, where the data store 206 of the large-scale event detection system 202 receives thermal data about a set of hosts from a set of environment temperature sensors 232, a set of server thermal sensors 228, and one or more monitoring agents 230. In some embodiments, the thermal data is provided to the data store 206 by a building management system of a building 226 housing the set of hosts (e.g., a data center).

The large-scale event detection system 202, large-scale event detector 204, and the data store 206 may be similar to the respective large-scale event detection system 102, large-scale event detector 104, and data store 106 of FIG. 1. FIG. 2 is illustrative only, and is intended to show one example of a way in which the large-scale detection system 202 can obtain thermal data about the set of hosts. The set of hosts 214 may be one or more computing systems in a distributed computing system of a computing resource service provider, such as web servers, data servers, or application servers in a data center, virtual computing systems, or any computer systems similar to the servers 806 and 808 and electronic client device 802 described in conjunction with FIG. 8. Each host of the set of hosts may be a physical or virtual computing system; however, the host thermal sensor 228 may report the current temperature of the physical central processing unit of the physical computing system for the respective host.

The building 226 may be a room or building of a data center containing host computing systems for a computing resource service provider. In the environment 200, each host of the set of hosts may have a sensor (i.e., the thermal sensor 228) for measuring the operating temperature of the host. Each host of the set of hosts may also have a monitoring agent 230, which may be implemented in hardware and/or software, which receives thermal data from the sensor of the host. The monitoring agent 230 may report the thermal data to the data store 206 directly or, as illustrated in FIG. 2, through a notification system 234.

The monitoring agent 230 may be a hardware or software agent configured to run on a respective host, receive thermal information from the host thermal sensor 228, and deliver that thermal information to a data store such as the data store 206. In some implementations, the monitoring agent 230 is be an application running under an operating system of the respective host. In other implementations, the monitoring agent 230 executes in a controlling domain or a virtualization layer (e.g., a hypervisor) of a computing system hosting virtual machine instances. In still another implementation, the monitoring agent 230 may be implemented in hardware, such as in a dongle attached to the physical computing system or integrated in the hardware of the physical computing system itself The building may have sensors (e.g., the set of environment temperature sensors 232) placed in various locations around the building, that report thermal data (e.g., temperature readings) gathered from their respective locations in the building. In some embodiments, such as that depicted in FIG. 2, the set of environment temperature sensors 232 report their respective thermal data to the data store 206 through the notification system 234. The notification system 234 may be a push messaging service configured to push messages containing thermal data to the data store 206. Note that, in some embodiments, the notification system 234 is not be present, and in such embodiments, thermal data may be delivered to the data store 206 via alternative methods (e.g., direct access to the data store 206 by the monitoring agent 230 and the building management system, message queue service, etc.). Note too that in some implementations, thermal data is stored in a separate data store, such as a data store of the building management system, rather than in the data store 206 of the large-scale event detection system 202. In such implementations, the large-scale event detector 204 or other component of the large-scale event detection system 202 may be configured to, upon detection of the occurrence of a large-scale event, access the separate data store for the thermal data in order to attempt to determine the cause of the large-scale event.

The collected thermal data may be used to construct a "heat map" that maps collected thermal and temperature values to respective hosts and areas within the data center. This heat map may be used by the large-scale event detection system 202 in its determination of whether a probable root cause of a large-scale event is thermally related. In some implementations, analysis of the heat map can allow the large-scale event detection system 202 to determine a likelihood of a large-scale event occurring. For example, in an implementation where the large-scale event detection system periodically analyzes the heat map, upon detecting that a large number of hosts are operating at a temperature above (i.e., in excess of) a particular threshold (i.e., maximum operating temperature), indicating cooling equipment failure, the large-scale event detection system 202 may notify appropriate data center personnel of the possible cooling equipment failure and that a large-scale event is likely to occur if the host temperatures are not brought down. Note that, in some cases, data indicating that the hosts are operating at a temperature below a particular threshold may be indicative of a probable root cause of a large-scale event. That is, a malfunctioning cooling component may cause hosts or network equipment to be cooled below a minimum operating temperature, and the hosts or networking equipment may stop responding as a result. Note also that data from other types of sensors are contemplated as being usable for determining a probable root cause of a large-scale event, such as, for example, data from humidity sensors in the building.

Figure 3:
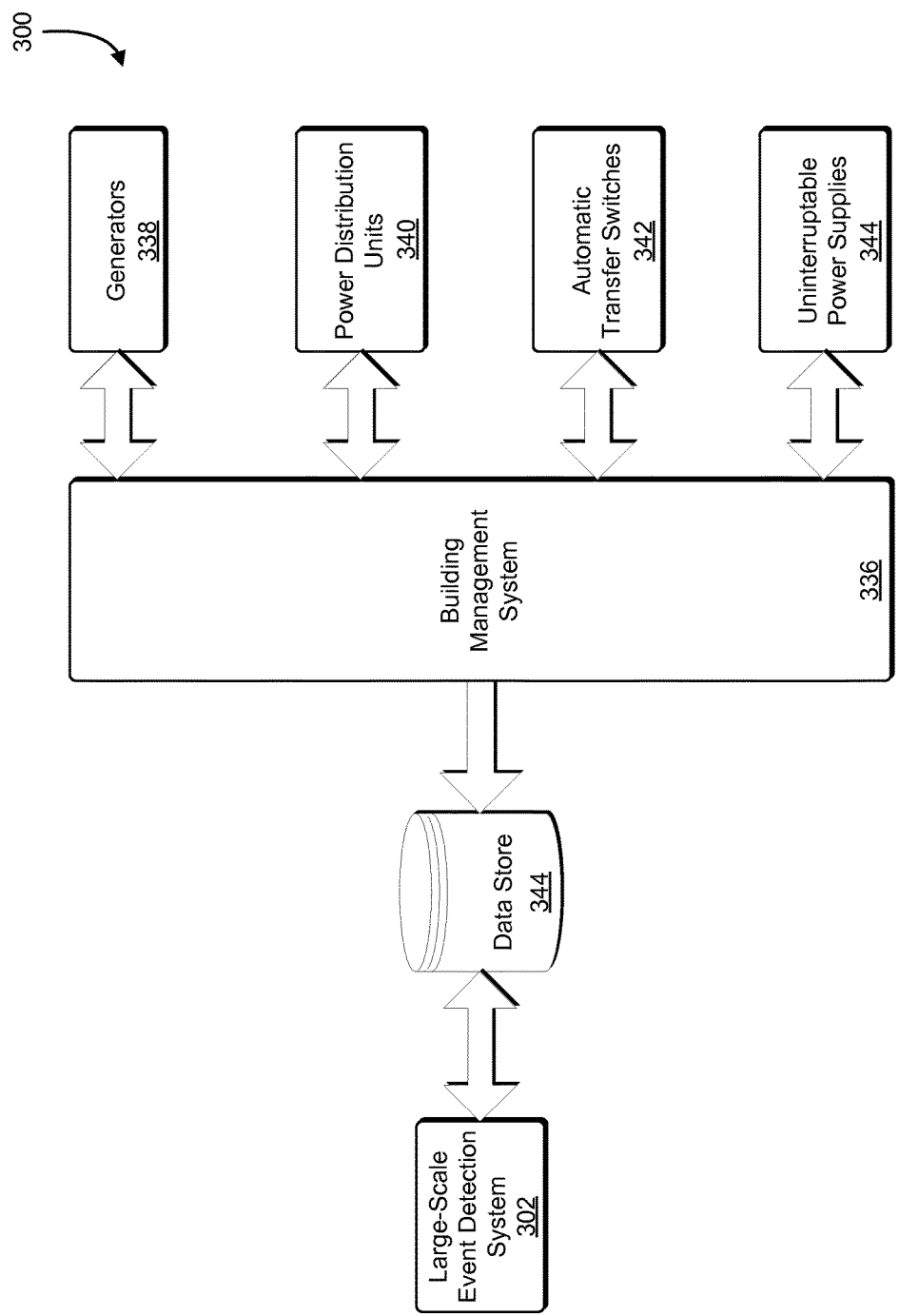
FIG. 3 illustrates an example of a large-scale event detection system accessing power data collected by a building management system in accordance with an embodiment.

FIG. 3 illustrates an aspect of an environment 300 in which an embodiment may be practiced. As illustrated in FIG. 3, the environment 300 may include a building management system 336 that monitors power components, such as generators, power distribution units, and automatic transfer switches, that stores data about the status of such power components in a data store 344 accessible to a large-scale event detection system 302 of the present disclosure. The large-scale event detection system 302 may be a large-scale event detection system similar to the large-scale event detection system 102 of FIG. 1, for detecting the occurrence of large-scale events that cause a set of hosts to be unresponsive.

The building management system 336 (also known as a building automation system) may be a computer-based control system installed in a building, such as a data center, and configured to monitor the building's mechanical, environmental, and electrical equipment. In addition to the generators, power distribution units, and automatic transfer switches shown in FIG. 3, the building management system 336 may also monitor and control ventilation, lighting, fire detection systems, thermostats, plumbing, elevators, access controls, various alarms, and security systems. The building management system may be comprised of hardware and/or software. The building management system may store data received from its monitored power components in the data store 344, which may then be accessed by the large-scale event detection system 302.

The generators 338 may be one or more components for generating electric power sufficient to power computing systems, such as sets of hosts in a data center, from other power sources. For example, the generators may be powered by gasoline, diesel, wind, or solar sources. In addition to the generators 338, the environment 300 may also include one or more uninterruptible power supplies having battery backups to provide power to computing systems for a certain period of time in the event of an external power outage. The generators 338 and/or uninterruptable power supplies 344 may communicate their status to the building management system 336, for example, an uninterruptible power supply may communicate to the building management system 336 a percentage of battery power remaining and an estimated amount of time, based on its current load, that it can supply power to its hosts before depleting its battery.

The power distribution units 340 may be devices having power outlets for distributing power to racks of computing systems (e.g., sets of hosts) and/or networking equipment in a building, such as a data center. The power distribution units may, in addition to supplying outlets for power, provide line conditioning, load balancing, and other power filtering functionality. The power distribution units may also be remotely controllable, such as through the building management system 336. The power distribution units may communicate their status and/or the status of their outlets to the building management system 336.

The automatic transfer switches 342 may be switches that can transfer an electrical load between sources. In some implementations, the automatic transfer switches, when sensing that one of its sources have lost power, automatically switch that source to a different source of power. Likewise, the automatic transfer switches, upon sensing that one of its sources has gained power, may automatically switch to use that source. In some implementations, upon sensing the loss of power of one of its sources, an automatic transfer switch can be configured to start one or more of the generators to begin providing temporary power. The automatic transfer switches of the present disclosure may be configured to communicate with the building management system 336; that is, it may communicate the status of its power sources and/or events, such as sensing that one of its sources has lost or regained power.

The data store 344 may be a data store for storing power information, such as information collected by a building management system 336 from power components that it is monitoring. Note, in some cases the data store 344 is a component of the building management system 336. In other cases, the data store 344 is a component of the large-scale event detection system 302, such as the data store 106 of FIG. 1. In still other cases, the data store 344 may be separate from the building management system 336 and large-scale detection system 302, but accessible by both systems.

Figure 4:
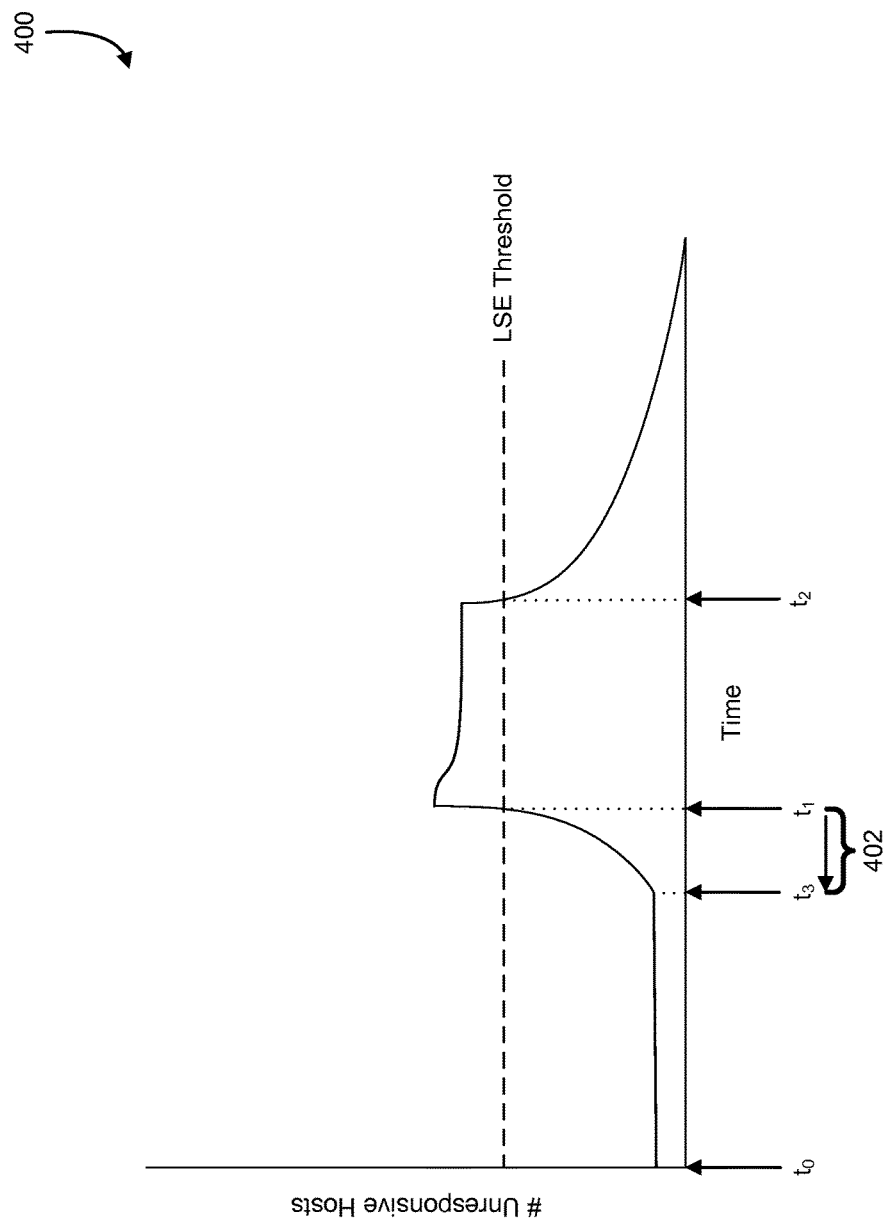
FIG. 4 is a two-dimensional graphical illustration of a large-scale event over time in accordance with an embodiment.

FIG. 4 illustrates a two-dimensional graph representation 400 of a large-scale event over a period of time, and determining a start time of the large-scale event based on a large-scale event threshold. In the graph representation depicted by FIG. 4, the y-axis indicates the number of hosts, the x-axis indicates time. The dashed line represents a large-scale event threshold, which as described in the present disclosure, may be a threshold number of unresponsive hosts (e.g., hosts that failed to respond to a ping request) specified as signaling a large-scale event. As can be seen in the two-dimensional graph representation, from time T0 to time T1, the number of unresponsive hosts falls beneath the large-scale event threshold, and therefore no large-scale event action is triggered. However, at or after time T1, the number of unresponsive hosts exceeds the large-scale event threshold, thereby triggering the system to determine a large-scale event has occurred. Once the large-scale event has been determined to occur, the large-scale event detection system may analyze data collected previous to time T1 to estimate a start time T3 of when the large-scale event actually started to happen. For example, failure of a cooling system may cause hosts to begin failing at time T3, but it may not be determinable that the cooling system failure will cause a large-scale event until the number of failing hosts exceed the large-scale event threshold.

Various heuristics may be implemented to determine the start time T3. For example, the system may look back a fixed amount of time 402 (e.g., 30 minutes, 10 minutes, 24 hours, etc.) from the time T1, and find the first host that went unresponsive within that fixed amount of time. That is, filtering out all unresponsive hosts between the time T0 and the time T3, which may be presumed to have been unresponsive independent of the particular large-scale event, and finding the first occurrence of a new unresponsive host. This occurrence may be determined to be the start time of the large-scale event. Another example, may again be to look back a fixed amount of time 402, and find a point where the number of unresponsive hosts deviates by more than a standard deviation from the number of unresponsive hosts between the time T0 and the time T3.

Figure 5:
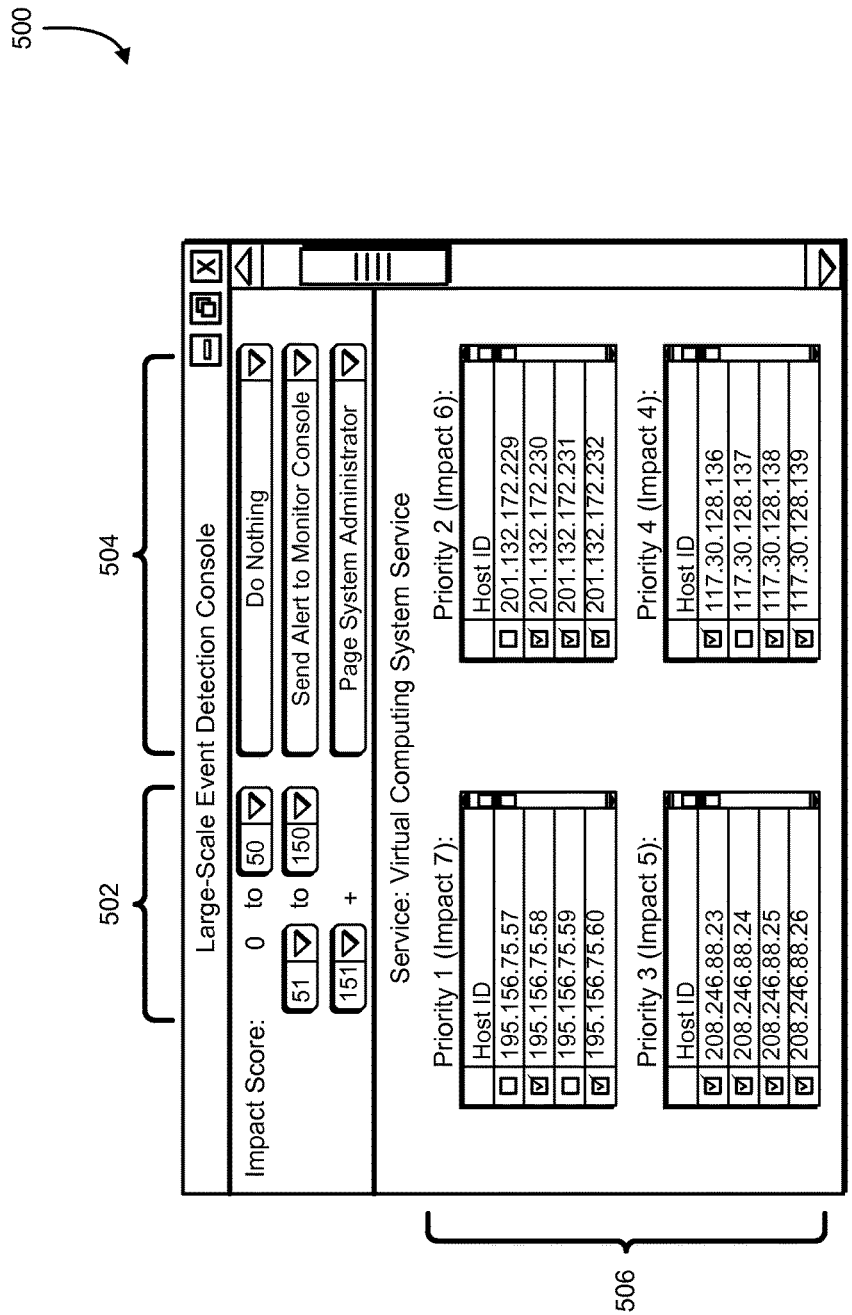
FIG. 5 illustrates an example of an interface for administrators of services of a computing resource service provider to input criteria for determining the occurrence of a large-scale event in accordance with an embodiment.

FIG. 5 illustrates an example interface 500 for specifying criteria for determining the occurrence of a large-scale event and for specifying actions to take when the specified criteria is met. The example interface 500 is for illustrative purposes only, and an actual implementation of such user interface may have a different appearance than that depicted in FIG. 5. The user interface includes various form controls for selecting criteria for determining different levels of large-scale events. The various form controls could include things like drop-down boxes, list boxes, multi-select boxes, text boxes, clickable buttons and graphics, radio buttons, checkboxes, and other appropriate form controls. The example interface 500 may be an interface for a service owner of a service provided by a computing resource service provider. In some examples, a "service owner" may refer to system administrators tasked with maintaining and troubleshooting hosts for a particular service of the computing resource service provider. Examples of such particular services include services such as, virtual computing system services, on-demand data storage services, notification services, message queuing services, policy management services, cryptography services, authentication system services, block levels data storage services, archival data storage services, and other computing services.

In the example shown in FIG. 5, the particular service for which large-scale event detection criteria is being specified is a virtual computing system service. In the example interface 500, the service owner is allowed to select a set of actions 504 to be performed if an impact based on nonresponsive hosts falls within a set of specified ranges 502. That is, the example interface 500 is configured to use an algorithm, described above, where hosts are prioritized based on importance (e.g., impact). For the specified range of 0 to 50, the specified action to be performed by the large-scale detection system is to do nothing. The specified range of 51 to 150 may indicate a mid-size large-scale event, and, when detected, the specified action to be performed is to send an alert to a monitoring application of the service owner. The specified range of 151 or greater may indicate a critical large-scale event, and the specified action to be performed is to page a system administrator. Thus in the example 500, the specified actions 504 are seen to escalate as the impact scores increase. Note that a user interface may be configured to allow additional levels of large-scale event types; e.g., an additional range of 30 to 50 could be designated as a small large-scale event, etc.

In the example shown in FIG. 5, hosts for the service may be grouped according to priority. For example, as shown in the first box, hosts 195.156.75.58 and 195.156.75.60 have been selected to have the highest priority; that is, each host selected in this box, if unresponsive, has been designated an impact value of seven. Similarly, as shown in the second box, hosts 201.132.172.230, 201.132.172.231, and 201.132.172.232 have been selected to have the second highest priority; that is, each of these hosts, if they went off-line, are considered to have an impact value of six. In other words, the set of hosts of the computing resource service provider may be grouped into subsets according to their importance, and each subset may be assigned an impact value. Then, a sum of unresponsive hosts weighted by their respective impact values may be used to determine the impact score, which may then be used to determine whether a large-scale event has occurred and/or an appropriate action to take.

Figure 6:
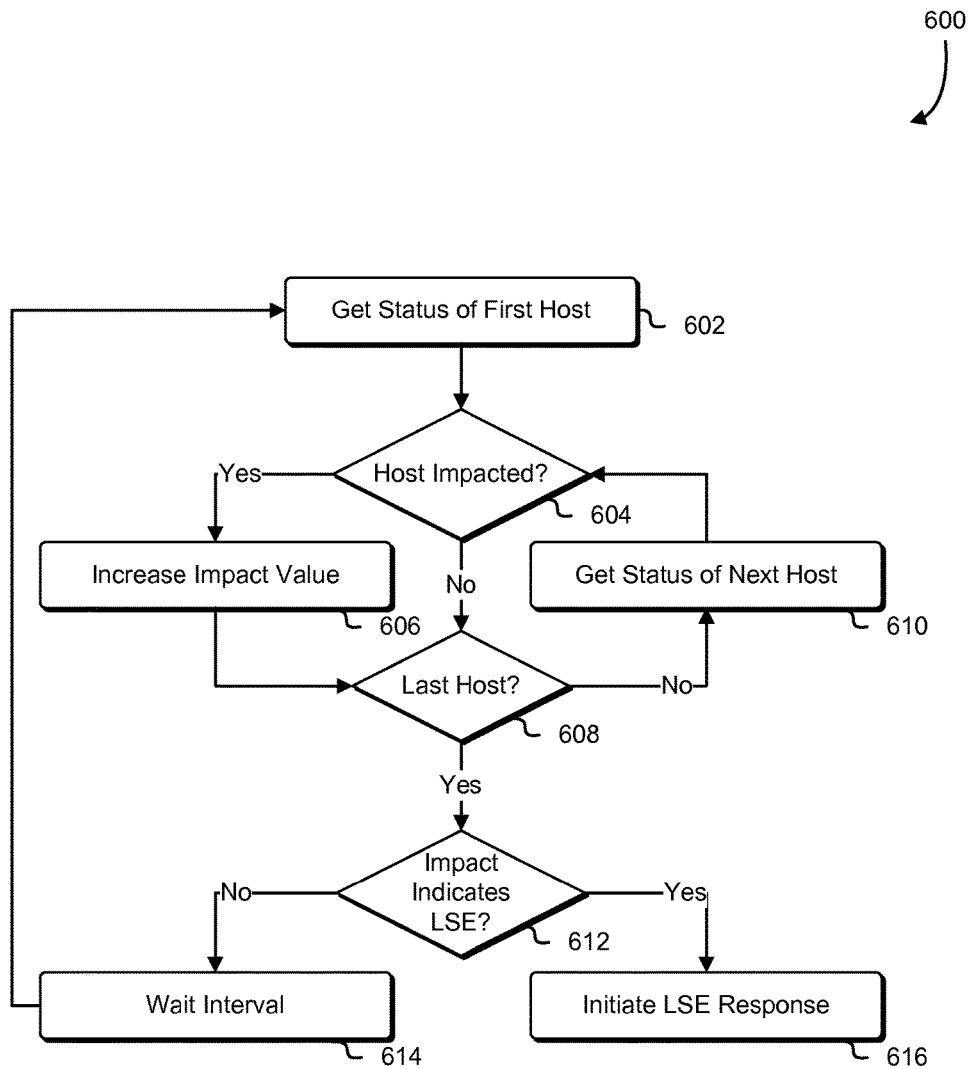
FIG. 6 is a flowchart that illustrates an example of determining the occurrence of a large-scale event in accordance with an embodiment.

FIG. 6 is a flowchart illustrating an example of a process 600 for determining the occurrence of a large-scale event in accordance with various embodiments. The process 600 may be performed by any suitable system such as a server in a data center, multiple computing devices in a distributed system of a computing resource service provider, or any electronic client device such as the electronic client device 802 described in conjunction with FIG. 8. The process 600 includes a series of operations wherein the statuses of each host in a set of hosts are analyzed to determine a total impact, and a determination is made based on the total impact whether a large-scale event has occurred.

In 602, the status of the first host is obtained. As noted, in some embodiments the status includes information received from a ping reply or includes the information indicating that the host did not respond to a ping request (i.e., the host was unresponsive). In some implementations, the status includes information relating to power, thermal, or network characteristics of the host. For example, in some of these implementations, the status of the host includes a current operating temperature of the host, which, although the host may currently be responsive to ping requests, may be utilized to determine a likelihood of future failure of the host; that is, if the host is currently operating at a temperature in excess of a safe temperature for the host, this thermal data may be indicative of a cooling failure and may be a predictor that the host is about to fail.

In 604, the system performing the process 600 determines whether the obtained status of the host has been impacted by a failure. For example, if the status of the host indicates that the host has failed to respond to a ping request, the system may determine that the host has been impacted. Upon determining that the host has been impacted, in 606, and impact value may be increased. The impact value may reflect a total impact of all impacted hosts of the set of hosts. In some embodiments, the impact value reflects a total number of hosts that are unresponsive. In such embodiments, each occurrence of an impacted host increment the impact value by one. In other embodiments, the impact value may additionally reflect a criticality of the impacted hosts; for example, hosts which provide critical services, such as a website for the customer's business, may cause the impact value to be increased more than hosts whose unresponsiveness is not as critical (e.g., hosts who services can still be provided by one or more separate redundant hosts). For example, as described above in the present disclosure, each host may be assigned a weight based on its criticality, such as a weight between one and seven. In this example, a host with minimum criticality may increment the impact value by only one, whereas a host with maximum criticality may increase the impact value by seven.

Once the impact value has been appropriately increased or if the host was not impacted, the system performing the process 600 may proceed to 608, whereupon the system determines whether the statuses of all hosts have been evaluated. If there are still more hosts remaining to be evaluated, the system performing the process 600 may proceed to 610, whereupon the status of the next host of the set of hosts is obtained. After obtaining the status of the next host, the system performing the process 600 may return to 604 to determine whether the status indicates that the host has been impacted.

Otherwise, if the statuses of all hosts have been evaluated, the system performing the process 600 may proceed to 612, whereupon the system determines whether the impact value indicates that a large-scale event has occurred. As noted in the present disclosure, in some embodiments the occurrence of a large-scale event is be determined by a total number of unresponsive hosts exceeding a specified threshold. Also as noted, in some embodiments the occurrence of a large-scale event is be determined by a number of unresponsive hosts weighted by a value that indicates criticality of the respective host exceeding a specified impact value (e.g., threshold). If the system performing the process 600 determines that a large-scale event has not occurred (e.g., the impact value computed in operations 604-10 does not exceed a threshold), the system may proceed to 614, whereupon the system may wait for a predetermined interval before repeating the process starting at 602. For example, the system performing the process 600 may be configured to check for the occurrence of a large-scale event every minute, and therefore the weight interval of 614 may be configured such that the operations of 602-12 are repeated every minute.

Otherwise, if the impact value indicates the occurrence of a large-scale event, the system performing the process 600 may proceed to 616, whereupon an appropriate response to the large-scale event may be caused to occur. The appropriate large-scale event response may be a remediation action taken as part of a process to recover affected systems from the large-scale event and to avoid recurrence of the large-scale event. In some embodiments, the appropriate response includes sending an alert to the customer (e.g., changing a graphical indicator in a user interface for the customer's hosts, sending a text message to the customer, sending an email message to the customer, etc.) whose hosts are impacted by the large-scale event. Additionally or alternatively, the appropriate response may include sending an alert to one or more system administrators of the computing resource service provider or datacenter responsible for maintaining the set of hosts. In some embodiments, the appropriate response further includes sending information in the alert such as a physical location of the impacted hosts in the data center, a duration for which the impacted host has been unresponsive, a start time of the large-scale event, and a determined probable root cause of the large-scale event. An example of a process for determining a probable root cause of a large-scale event may be found in FIG. 7. In some embodiments, the appropriate response includes sending a boot request to the impacted hosts to attempt to boot up the impacted hosts. Note that one or more of the operations performed in 602-16 may be performed in various orders and combinations, including in parallel.

Figure 7:
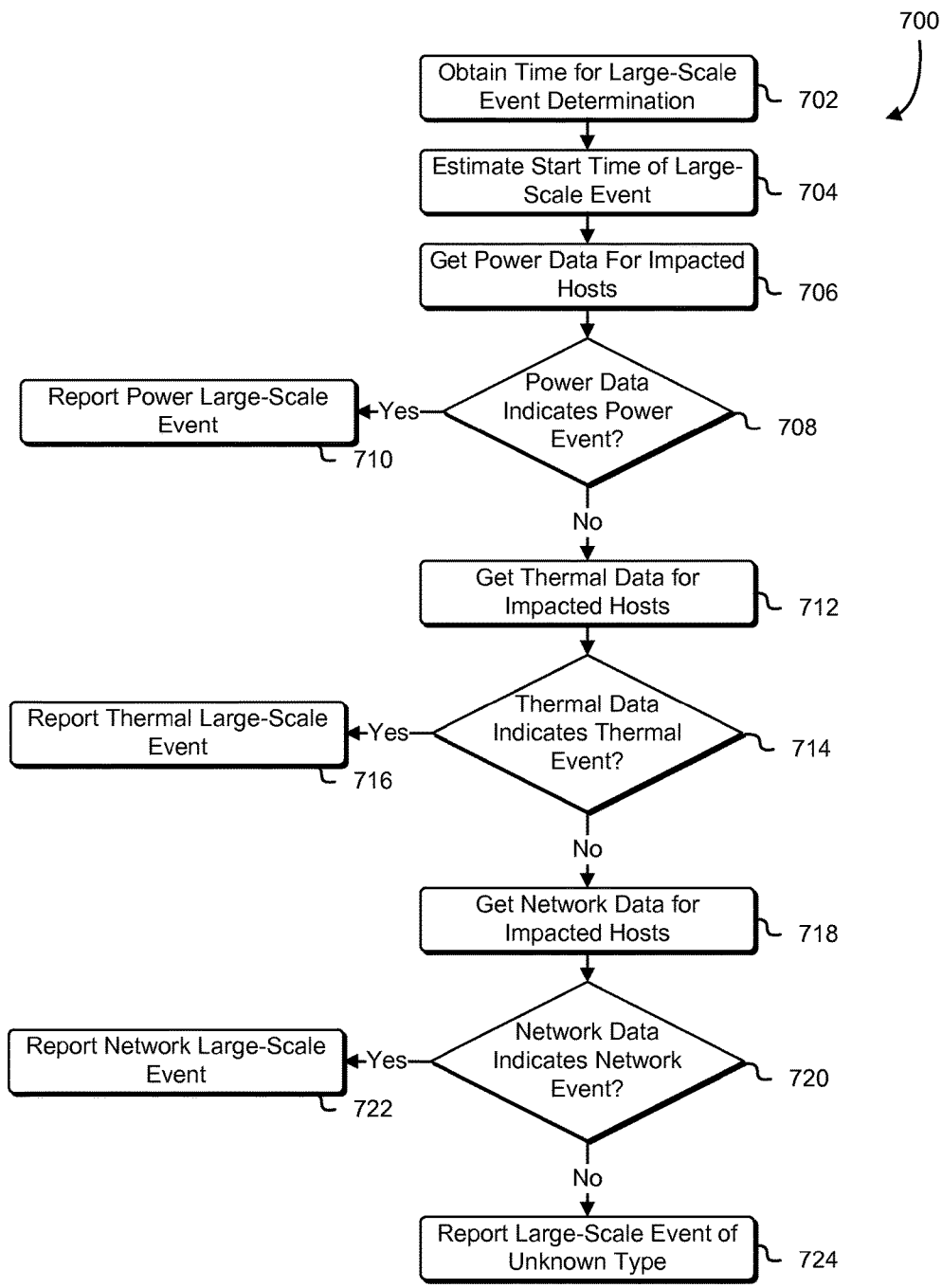
FIG. 7 is a flowchart that illustrates an example of determining a probable root cause of a large-scale event in accordance with an embodiment.

FIG. 7 is a flowchart illustrating an example of a process 700 for determining the probable root cause of a large-scale event in accordance with various embodiments. The process 700 may be performed by any suitable system such as a server in a data center, multiple computing devices in a distributed system of a computing resource service provider, or any electronic client device such as the electronic client device 802 described in conjunction with FIG. 8. The process 700 includes a series of operations wherein after determining that a large-scale event has occurred, analyzing power, thermal, and network data to determine the probable root cause of the large-scale event.

In 702, the time corresponding to a time when the event is determined to qualify as a large-scale event is obtained. For example, this time may be the time at which a number of unresponsive hosts exceed the threshold, or this time may be a time at which a total impact (e.g., some of unresponsive hosts adjusted by a weight reflecting criticality of the host) exceeds a threshold. Based at least in part on this time, in 704, a start time for the large-scale event may be estimated. For example, from the time obtained in 702, the system performing the process 700 may examine data collected for a period of time (e.g., within the last hour, within the last day, etc.) before the time obtained in 702, filtering out those hosts whose unresponsiveness may be unrelated to the large-scale event (e.g., hosts which have been unresponsive for a length of time beginning prior to a likely start time of large-scale event), and determine a start time for the large-scale event based on the earliest host that suddenly became unresponsive during that period of time.

Having the start time of the large-scale event, in 706, the system performing the process 700 may obtain power data collected during this period of time and/or collected for a period immediately preceding the start time of the large-scale event. In 708, the system performing the process 700 may determine whether the power data indicates that the probable root cause of the large-scale event is power-related (e.g., generator failure, UPS failure, or other power failure). For example, if the system performing the process 700 reads power data supplied to a database by a building management system that indicates that one or more racks of hosts lost power (or networking equipment lost power) immediately preceding the detection of a large-scale event, the system may determine that the probable root cause of the large-scale event was power related; that is, the hosts are unresponsive because the loss of power has rendered them unable to respond. Similarly, if one or more racks were suddenly powered up, the building management system may store data reflecting a surge in power demand at a time immediately preceding the detection of the large-scale event. Consequently, the system may infer that the probable root cause of the large-scale event is related to the sudden surge in power demand.

Upon determination that the probable root cause of the large-scale event is power related, the system performing the process 700 may proceed to 710, whereupon the system may report, such as through an alert similar to the alert 116 of FIG. 1, that the probable root cause of the large-scale event is considered to be power related. Information in such a report may include information such as amounts of power being consumed by racks or hosts at various points in time, durations, and times of power outages and surges, and detected failures of any power equipment.

Otherwise if the probable root cause of the large-scale event is determined not to be power related, the system performing the process may proceed to 712, whereupon thermal data may be obtained. As noted, thermal data may include data about the operating temperature of each host or rack of hosts of the set of hosts, and/or environmental temperature data (e.g., temperatures measured by one or more sensors located at various points in a room or building of a data center). Also as noted, the thermal data may be obtained directly or indirectly from environment temperature sensors coupled to a building management system and/or thermal sensors at each host of the set of hosts.

In 714, the system performing the process 700 may determine whether the obtained thermal data indicates that the probable root cause of the large-scale event is thermally related. For example, if thermal data collected immediately prior to a determined start time of the large-scale event reflects that the operating temperatures of the impacted hosts exceeded a safe operating temperature for the hosts, the system may determine that this excess operating temperature was the probable root cause of the large-scale event. Likewise, if one or more environmental sensors indicates that the temperature in the environment of the set of hosts exceeded a recommended temperature (e.g., due to an air-conditioning malfunction), the system may infer that the excessive environmental temperature caused or contributed to the large-scale event. In such cases where it is determined that the large-scale event is thermally related, the system performing the process 700 may proceed to 716, whereupon the system may report, such as through an alert similar to the alert 116 of FIG. 1, that the probable root cause of the large-scale event is considered to be thermally related. Information in such a report may include information such as times and temperatures recorded over periods of time immediately prior to and/or following the start time of the large-scale event, and any recorded failures of cooling equipment.

Otherwise, if the probable root cause of the large-scale event is not determined to be thermally related, the system performing the process 700 may proceed to 718, whereupon the system may analyze network data associated with the impacted hosts. Such network data may include identities of routers and switches, network latencies, counts of incoming and outgoing packets, and packet loss data. The network data may be collected by the large-scale event detection system or may be collected by a separate system that allows the large-scale event detection system access to its collected data. The network data may be data obtained from pings, traceroute commands, and other network diagnostic commands and stored to a data store.

In 720, the system performing the process 700 may determine whether the network data indicates that the probable root cause of the large-scale event is network related. For example, the system may determine that a router associated with the impacted hosts is also not responsive (e.g., the router fails to respond to a ping request), and in such a case the system may determine that the failure of the router is the probable root cause of the large-scale event. Similarly, the system may note a sudden surge of incoming packets to impacted hosts of the set of hosts, and based at least in part on the sudden surge may determine that the impacted hosts were targets of a denial of service attack.

Upon determination that the network data indicates that the probable root cause of the large-scale event was network related, the system performing the process 700 may proceed to 722, whereupon the system may report, such as through an alert similar to the alert 116 of FIG. 1, that the probable root cause of the large-scale event is considered to be network related. Information in such a report may include information such as traceroute information and packet loss associated with the impacted host measured immediately prior to the estimated start time of the large-scale event, as well as any detected failures of networking equipment.

Otherwise, if the system performing the process 700 was unable to determine the probable root cause of the large-scale event, the system may proceed to 724, whereupon the system may report the occurrence of the large-scale event but may note that it was unable to determine, based on power, thermal, and network data, the root cause of the large-scale event. Note that one or more of the operations performed in 702-24 may be performed in various orders and combinations, including in parallel. For example, the system performing the process 700 may be configured to check for a network related event first, or may be configured to check for a thermally related event last. Note too that the operations of 710 and 716 may not terminate at that step. For example, after performing the operations of 710, the system performing the process 700 may proceed to 712. Similarly, after performing the operations of 716, the system may proceed to 718. In this manner, large-scale events that are caused by a combination of factors may be determined. Note as well, although the present disclosure describes root causes of power, thermal, and network failures, it is contemplated as within the scope of the present disclosure that other large-scale event root causes may be detectable by the system of the present disclosure.

Note that, unless otherwise specified, use of expressions regarding executable instructions (also referred to as code, applications, agents, etc.) performing operations that instructions do not ordinarily perform unaided (e.g., transmission of data, calculations, etc.) in the context of describing disclosed embodiments denote that the instructions are being executed by a machine, thereby causing the machine to perform the specified operations.

Figure 8:
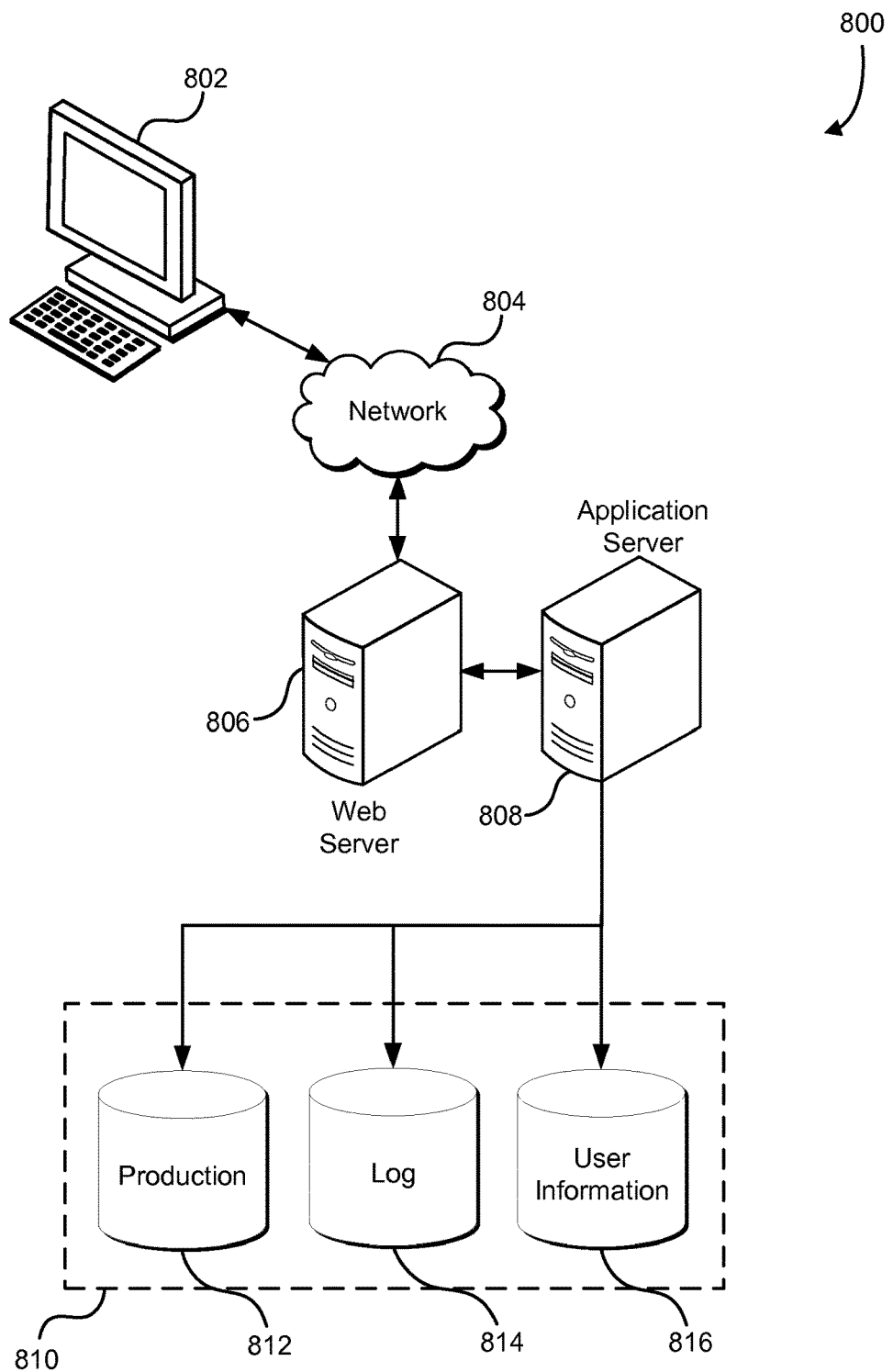
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network 804 can include any appropriate network, including an intranet, the Internet, a cellular network, a local area network, a satellite network or any other network and/or combination thereof. Components used for such a system can depend at least in part upon the type of network and/or environment selected. Protocols and components for communicating via such a network are well known and will not be discussed in detail. Communication over the network 804 can be enabled by wired or wireless connections and combinations thereof. In this example, the network 804 includes the Internet, as the environment includes a web server 806 for receiving requests and serving content in response thereto, although for other networks an alternative device serving a similar purpose could be used as would be apparent to one of ordinary skill in the art.

The illustrative environment includes an application server 808 and a data store 810. It should be understood that there could be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, servers may refer to a programming module being executed on a computer system. As used, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server 808 can include any appropriate hardware, software and firmware for integrating with the data store 810 as needed to execute aspects of one or more applications for the electronic client device 802, handling some or all of the data access and business logic for an application. The application server 808 may provide access control services in cooperation with the data store 810 and is able to generate content including, text, graphics, audio, video and/or other content usable to be provided to the user, which may be served to the user by the web server 806 in the form of HyperText Markup Language ("HTML"), Extensible Markup Language ("XML"), JavaScript, Cascading Style Sheets ("CSS"), or another appropriate client-side structured language. Content transferred to a client device may be processed by the electronic client device 802 to provide the content in one or more forms including, forms that are perceptible to the user audibly, visually and/or through other senses including touch, taste, and/or smell. The handling of all requests and responses, as well as the delivery of content between the electronic client device 802 and the application server 808, can be handled by the web server 806 using PHP: Hypertext Preprocessor ("PHP"), Python, Ruby, Perl, Java, HTML, XML, or another appropriate server-side structured language in this example. It should be understood that the web server 806 and application server 808 are not required and are merely example components, as structured code discussed can be executed on any appropriate device or host machine as discussed elsewhere. Further, operations described as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store 810 may include mechanisms for storing production data 812 and user information 816, which can be used to serve content for the production side. The data store 810 also is shown to include a mechanism for storing log data 814, which can be used for reporting, analysis or other purposes. It should be understood that there can be many other aspects that may need to be stored in the data store 810, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other applications may be generated by server-side structured languages as described or may be provided by a content management system ("CMS") operating on, or under the control of, the application server 808. In one example, a user, through a device operated by the user, might submit a search request for a certain type of item. In this case, the data store 810 might access the user information 816 to verify the identity of the user and can access the catalog detail information to obtain information about items of that type. The information then can be returned to the user, such as in a results listing on a web page that the user is able to view via a browser on the electronic client device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the example environment 800 in FIG. 8 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize a network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network 804 can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network 8. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit ("CPU" or "processor"), an input device (e.g., a mouse, keyboard, controller, touch screen or keypad), and an output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a wireless or wired network card, an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims.

Other variations are within the spirit of the present disclosure. Thus, while the techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a," "an," and "the" and similar referents in the context of describing the embodiments (especially in the context of the following claims) are to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
   obtaining, through an application programming interface, a set of criteria usable to determine an occurrence of a large-scale event impacting one or more hosts of a plurality of hosts of a computing resource service provider, the one or more hosts providing one or more services to a customer of the computing resource service provider;
   determining one or more subsets of the plurality of hosts that are unresponsive;
   for each subset of the one or more subsets:
      computing an impact value for the subset, the impact value based at least in part on a current status of the subset; and
      modifying the impact value by a respective impact weight to produce a modified impact value, wherein the respective impact weight is based at least in part on a count of hosts in the subset and a criticality of a service that the subset of hosts provides to the customer;
   determining a total impact based at least in part on a sum of modified impact values of the one or more subsets;
   determining the occurrence of the large-scale event based at least in part on determining that the total impact meets the set of criteria;
   determining a large-scale event response to initiate based at least in part on a probable root cause of the large-scale event; and
   initiating the large-scale event response.

2. The computer-implemented method of claim 1, wherein a status of each host of the plurality of hosts is based at least in part on whether the host responded to an echo request.

3. The computer-implemented method of claim 1, further comprising:
   determining a start time of the large-scale event based at least in part on statuses of the plurality of hosts during a period prior to a time at which the total impact was determined to meet the set of criteria; and
   wherein the large-scale event response is further based at least in part on the start time.

4. The computer-implemented method of claim 1, further comprising:
   obtaining a set of data from one or more sources of power data, thermal data, or network data; and
   determining, based at least in part on the set of data, a root cause of the large-scale event.

5. A system, comprising:
one or more processors; and
memory including instructions that, upon execution by the one or more processors, cause the system to:
for a set of hosts providing services to one or more customers of a computing resource service provider:
determine a subset of the set of hosts that are unresponsive;
compute an impact value, based at least in part on a count of hosts in the subset; and
modify the impact value with a weight value to produce a modified impact value, wherein the weight value is based at least in part on a criticality of a service that the subset of hosts provides to the customer, the modified impact value being usable in part to determine whether an event affecting multiple hosts has occurred; and
determine whether to perform a large-scale event action based at least in part on a sum of modified impact values of the subset of hosts exceeding a threshold.

6. The system of claim 5, wherein the instructions that cause the system to initiate the large-scale event action include instructions that cause the system to notify a system administrator of an occurrence of the event affecting multiple hosts.

7. The system of claim 5, wherein the instructions that cause the system to initiate the large-scale event action further include instructions that cause the system to notify a customer associated with an unresponsive host of an occurrence of the event affecting multiple hosts.

8. The system of claim 5, wherein the large-scale event action includes sending, to each unresponsive host, a remote request to apply power to boot the unresponsive host.

9. The system of claim 5, wherein the instructions further include instructions that cause the system to receive, through a user interface, a selection for the threshold and a selection of the large-scale event action to perform if the threshold is exceeded.

10. The system of claim 5, wherein the instructions further include instructions that cause the system to, based at least in part on a determination to initiate the large scale event action:
obtain a set of data from one or more sources of power data, thermal data, or network data; and
determine, based at least in part on the set of data, a root cause of the event affecting multiple hosts.

11. The system of claim 10, wherein the instructions that cause the system to determine the root cause of the event affecting multiple hosts further include instructions that cause the system to determine that the root cause of the event affecting multiple hosts is power related, based at least in part on the power data indicating that unresponsive hosts of the set of hosts have insufficient power to respond.

12. The system of claim 10, wherein the instructions that cause the system to determine the root cause of the event affecting multiple hosts further include instructions that cause the system to determine that the root cause of the event affecting multiple hosts is thermally related, based at least in part on thermal data indicating that unresponsive hosts of the set of hosts were operating at a temperature below a minimum temperature or above a maximum temperature prior to an occurrence of the event affecting multiple hosts.

13. A non-transitory computer-readable storage medium having stored thereon executable instructions that, upon execution by one or more processors of a computer system, cause the computer system to at least:
for a set of hosts providing services to one or more customers of a computing resource service provider, determine one or more subsets of hosts of the set of hosts that are unresponsive, wherein each of the one or more subsets is assigned a respective weight value, the respective weight value based at least in part on a criticality of one or more services that the subset of hosts provides to the customer;
compute a result based at least in part on a count of hosts in each subset modified by the respective weight value assigned to the subset;
determine whether the result meets a set of criteria for an occurrence of an event affecting multiple hosts; and
based at least in part on a determination that the set of criteria is met, initiate a remediation action.

14. The non-transitory computer-readable storage medium of claim 13, wherein the executable instructions that cause the computer system to determine that the set of criteria is met include instructions that cause the computer system to determine that a count of hosts in the one or more subsets of hosts exceeds a threshold.

15. The non-transitory computer-readable storage medium of claim 13, wherein the executable instructions further include instructions that cause the computer system to determine an estimated start time of a large-scale event based at least in part on a time that a host of the one or more subsets of hosts became unresponsive during a period prior to determining that the set of criteria was met.

16. The non-transitory computer-readable storage medium of claim 13, wherein a host that has been unresponsive for an amount of time that indicates that unresponsiveness of the host is unrelated to the event affecting multiple hosts is not included in the one or more subsets of hosts.

17. The non-transitory computer-readable storage medium of claim 13, wherein the executable instructions further include instructions that cause the computer system to:
determine a root cause of the event affecting multiple hosts based at least in part on an analysis of one or more of power component data, thermal data, or network data; and
wherein the remediation action is based at least in part on the root cause.

18. The non-transitory computer-readable storage medium of claim 17, wherein the power component data includes data collected from one or more of a power distribution unit, an automatic transfer switch, a generator, or an uninterruptible power supply.

19. The non-transitory computer-readable storage medium of claim 17, wherein the thermal data includes data collected from one or more of a thermal sensor of a host of the set of hosts or an environmental temperature sensor.

* * * * *